(12) United States Patent
Lin et al.

(10) Patent No.: US 9,904,089 B2
(45) Date of Patent: Feb. 27, 2018

(54) ARRAY SUBSTRATE, DISPLAY PANEL AND DISPLAY METHOD THEREOF, DISPLAY DEVICE

(71) Applicants: BOE TECHNOLOGY GROUP CO., LTD., Beijing (CN); HEFEI BOE OPTOELECTRONICS TECHNOLOGY CO., LTD., Hefei, Anhui (CN)

(72) Inventors: Jianchao Lin, Beijing (CN); Guolei Wang, Beijing (CN); Ming Hu, Beijing (CN)

(73) Assignees: BOE TECHNOLOGY GROUP CO., LTD., Beijing (CN); HEFEI BOE OPTOELECTRONICS TECHNOLOGY CO., LTD., Hefei, Anhui (CN)

( * ) Notice: Subject to any disclaimer, the term of this patent is extended or adjusted under 35 U.S.C. 154(b) by 15 days.

(21) Appl. No.: 14/425,991

(22) PCT Filed: May 23, 2014

(86) PCT No.: PCT/CN2014/078229
§ 371 (c)(1),
(2) Date: Mar. 4, 2015

(87) PCT Pub. No.: WO2015/100927
PCT Pub. Date: Jul. 9, 2015

(65) Prior Publication Data
US 2016/0041415 A1 Feb. 11, 2016

(30) Foreign Application Priority Data
Dec. 30, 2013 (CN) .......................... 2013 1 0750877

(51) Int. Cl.
*G09G 5/00* (2006.01)
*G02F 1/1333* (2006.01)
(Continued)

(52) U.S. Cl.
CPC ........ *G02F 1/13338* (2013.01); *G02F 1/1368* (2013.01); *G02F 1/136213* (2013.01);
(Continued)

(58) Field of Classification Search
CPC ............. G02F 1/1368; G02F 1/136213; G06F 3/0412; G06F 3/044; G06F 3/0416; H05K 1/0289; G09G 2300/0439
(Continued)

(56) References Cited

U.S. PATENT DOCUMENTS 8,749,515 B2 * 6/2014 Kim ...................... G06F 3/0412
345/174
2005/0094038 A1 * 5/2005 Choi ..................... G06F 3/0412
349/12
(Continued)

FOREIGN PATENT DOCUMENTS

CN      1875312 A     12/2006
CN      101840084 A    9/2010
(Continued)

OTHER PUBLICATIONS

First Office Action dated Sep. 22, 2015 corresponding to Chinese application No. 201310750877.8
(Continued)

*Primary Examiner* — Jennifer Nguyen
(74) *Attorney, Agent, or Firm* — Nath, Goldberg & Meyer; Joshua B. Goldberg

(57) ABSTRACT

The present invention provides an array substrate, a display panel and a display method thereof, as well as a display device. The array substrate of the present invention comprises data lines and gate lines formed on a substrate, the data lines and the gate lines are provided intersecting with and insulating from each other and define a plurality of pixel units, each of which comprises: a storage capacitor and a first thin film transistor, a gate of the first thin film transistor is connected to the corresponding gate line, a source thereof is connected to the corresponding data line, and a drain thereof is connected to one end of the storage capacitor,
(Continued)

wherein, touch-control units are provided in at least a part of the pixel units.

14 Claims, 2 Drawing Sheets

(51) Int. Cl.
    *G06F 3/041*     (2006.01)
    *G06F 3/044*     (2006.01)
    *G02F 1/1362*     (2006.01)
    *G02F 1/1368*     (2006.01)

(52) U.S. Cl.
    CPC ............ G06F 3/044 (2013.01); G06F 3/0412 (2013.01); G06F 3/0416 (2013.01)

(58) Field of Classification Search
    USPC ..................................... 345/87–89, 173, 204
    See application file for complete search history.

(56) References Cited

U.S. PATENT DOCUMENTS

| | | | |
|---|---|---|---|
| 2011/0096023 A1* | 4/2011 | Shih | G06F 3/0412 345/174 |
| 2011/0115733 A1 | 5/2011 | Shih | |
| 2011/0169772 A1* | 7/2011 | Liu | G06F 3/0412 345/175 |
| 2011/0216023 A1* | 9/2011 | Kurokawa | G06F 3/0412 345/173 |
| 2011/0310036 A1 | 12/2011 | Juan et al. | |
| 2014/0210777 A1* | 7/2014 | Saito | G06F 3/0416 345/174 |
| 2015/0171119 A1* | 6/2015 | Li | G06F 3/044 257/254 |
| 2016/0018918 A1* | 1/2016 | Chen | G06F 3/0412 345/175 |

FOREIGN PATENT DOCUMENTS

| | | |
|---|---|---|
| CN | 201754208 U | 3/2011 |
| CN | 202838270 U | 3/2013 |
| CN | 203299793 U | 11/2013 |
| CN | 103454800 A | 12/2013 |
| CN | 203643714 U | 6/2014 |

OTHER PUBLICATIONS

English translation of the Written Opinion of the International Searching Authority dated Sep. 26, 2014 corresponding to International application No. PCT/CN2014/078229 that was originally provided to the USPTO on Mar. 4, 2015 with the application.
Search Report issued in International Application No. PCT/CN2014/078229 dated May 23, 2014 (May 23, 2014).

\* cited by examiner though. The in-cell
ARRAY SUBSTRATE, DISPLAY PANEL AND DISPLAY METHOD THEREOF, DISPLAY DEVICE This is a National Phase Application filed under 35 U.S.C. 371 as a national stage of PCT/CN2014/078229 filed on May 23, 2014, an application claiming the benefit to Chinese application No. 201310750877.8 filed on December 30, 2013; the content of each of which is hereby incorporated by reference in its entirety.

FIELD OF THE INVENTION

The present invention relates to the field of display technology, and particularly to an array substrate, a display panel and a display method thereof, and a display device.

BACKGROUND OF THE INVENTION

Currently, input devices such as mice, keyboards, sensor panels, touch screens and the like are being widely used in electronic products such as computers, PADs, mobile phones and the like. Especially, touch screens, due to easy operation and continuously reduced cost, have become more and more popular.

Relative to the prior art (e.g., traditional type and OGS) in which a touch panel is provided on a liquid crystal panel, a technique in which a touch panel function is integrated in a liquid crystal panel becomes increasingly prevailing. Integration of a touch panel and a liquid crystal panel includes "in-cell" technique and "on-cell" technique. The in-cell technique refers to a method in which a touch panel function is embedded into pixel units of a liquid crystal panel. The on-cell technique refers to a method in which a touch panel function is embedded between a color filter substrate and a polarizer film. By integrating a touch panel part, which originally was provided externally, with a liquid crystal panel, a panel can be implemented to be thin and light in weight. In addition, in the prior art in which a touch panel is provided outside a liquid crystal panel, a physical space exists between the liquid crystal panel and the touch panel, and therefore, light from outside and the like may be reflected between an upper surface of the liquid crystal panel and a lower surface of the touch panel, resulting in deteriorated visibility in bright outdoor environments. If the external touch panel part can be integrated with the liquid crystal panel, the phenomenon of deteriorated visibility in the outdoors can be suppressed.

The in-cell technique fails to achieve progress in practicality, as it is difficult to ensure yield rate and display performance. This is mainly because a touch sensor needs to be embedded inside each pixel unit on a TFT array substrate. For this purpose, it is necessary to adopt complex semiconductor manufacturing process, which becomes a stumbling block to the improvement of the yield rate. Further, embedding the touch sensor in the pixel may reduce an area portion that can be used for displaying, thus resulting in deteriorated picture quality.

SUMMARY OF THE INVENTION

Technical problem to be solved by the present invention includes providing an array substrate having a relatively large display area, a display panel and a display method thereof, as well as a display device, in view of the above problems in the existing in-cell technique.

A technical solution used to solve the technical problem of the present invention is an array substrate, which comprises data lines and gate lines formed on a substrate, the data lines and the gate lines are provided intersecting with and insulating from each other and define a plurality of pixel units, each of which comprises: a storage capacitor and a first thin film transistor, a gate of the first thin film transistor is connected to the corresponding gate line, a source thereof is connected to the corresponding data line, and a drain thereof is connected to one end of the storage capacitor, wherein, touch-control units are provided in at least a part of the pixel units.

Preferably, in two adjacent rows of the pixel units defined by a first gate line, a second gate line and a third gate line which are sequentially arranged, the touch-control units are provided in one row of the pixel units.

Further preferably, the array substrate further comprises sensing lines and signal lines, and each touch-control unit comprises: a second thin film transistor and a third thin film transistor, wherein, in each pixel unit provided with the touch-control unit, the gate of the first thin film transistor is connected to the third gate line;

a gate of the second thin film transistor is connected to the first gate line, a drain thereof is connected to the signal line, and a source thereof is connected to the drain of the first thin film transistor; and a gate of the third thin film transistor is connected to the second gate line, a source thereof is connected to a processor through the sensing line, and a drain thereof is connected to the drain of the first thin film transistor.

Still further preferably, an amplifier is provided between the sensing line and the processor, an input terminal of the amplifier is connected to the sensing line, an output terminal thereof is connected to the processor, and the amplifier is used for amplifying an electrical signal received by the sensing line.

Further preferably, the touch-control units provided in the pixel units in a same column are connected to a same sensing line.

Further preferably, the touch-control units provided in the pixel units in a same column are connected to a same signal line.

A technical solution used to solve the technical problem of the present invention is a display panel, which comprises the above array substrate.

A technical solution used to solve the technical problem of the present invention is a display method of a display panel, the display panel comprises the above array substrate, and the display method comprises:

in a touch-control phase, providing touch-control driving signals to the touch-control units, so as to determine a position of a touch point; and in a display phase, providing grayscale signals to the array substrate, so as to enable the pixel units to display.

Preferably, the display method may specifically comprise:

in the touch-control phase, inputting a scanning signal through the first gate line to turn on the second thin film transistor, so that the storage capacitor in the pixel unit in which the touch-control unit is provided is charged through the signal line; inputting a scanning signal through the second gate line to turn on the third thin film transistor, so that the storage capacitor in the pixel unit in which the touch-control unit is provided discharges and information of a charge quantity is transferred to the processor; and in the display phase, inputting a scanning signal through the third gate line to turn on the first thin film transistor, and inputting a grayscale signal through the data line to drive the pixel unit to display.

A technical solution used to solve the technical problem of the present invention is a display device, which comprises the above display panel.

Since in the array substrate of the present invention, touch-control units are only provided in a part of the pixel units, compared to an existing touch-control array substrate in which a touch sensor is provided in each pixel unit, the array substrate of the present embodiment has a significantly increased display area, aperture ratio of a display panel formed by assembling the array substrate and a color filter substrate is increased, and thus a display device has a better display effect.

DETAILED DESCRIPTION OF THE EMBODIMENTS

To enable those skilled in the art to better understand the technical solutions of the present invention, the present invention will be further described below in detail in conjunction with the accompanying drawings and the specific implementations.

Figure 1:
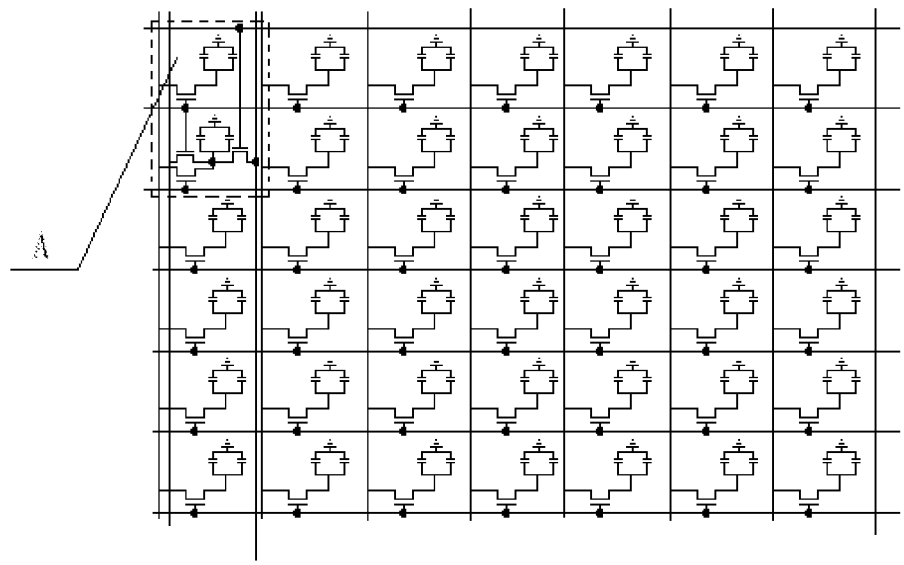
FIG. 1 is a schematic diagram of an array substrate provided by Embodiment 1 of the present invention.
Figure 2:
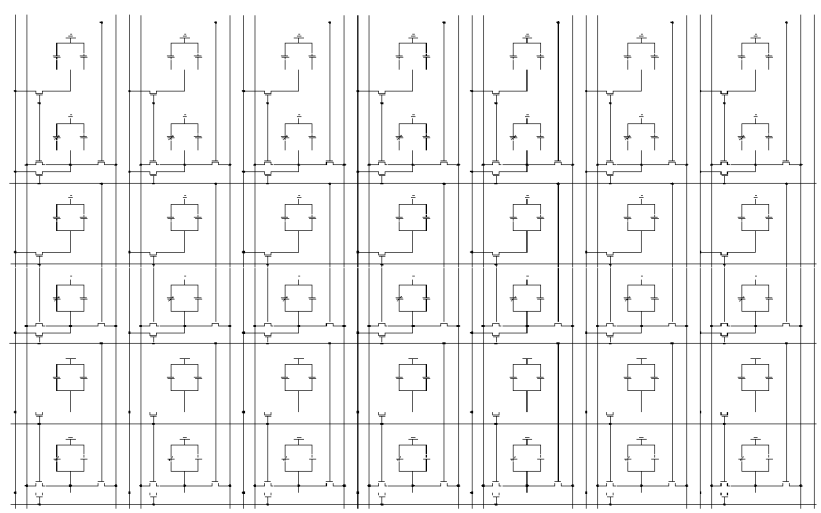
FIG. 2 is a schematic diagram of another array substrate provided by Embodiment 1 of the present invention.

Embodiment 1:

FIG. 1 is a schematic diagram of an array substrate provided by the present embodiment. As shown in FIGS. 1 and 2, the present embodiment provides an array substrate, which comprises data lines Data and gate lines formed on a substrate, the data lines Data and the gate lines are provided intersecting with and insulating from each other and define a plurality of pixel units, and touch-control units are provided in at least a part of the pixel units.

Since in the present embodiment, touch-control units are only provided in a part of the pixel units, compared to an existing touch-control array substrate in which a touch-control sensor is provided in each pixel unit, the array substrate of the present embodiment has a significantly increased display area, and thus aperture ratio of a display panel formed by assembling the array substrate and a color filter substrate is accordingly increased.

It should be understood that, although only one area A in the top-left corner is shown in FIG. 1, the array substrate shown in FIG. 2 can be obtained by repeatedly arranging the area A in the row and column directions.

Specifically, as shown in FIG. 2, in every two adjacent rows of the pixel units, only one row of the pixel units are provided with the touch-control units therein, and the two adjacent rows of the pixel units are defined by a first gate line, a second gate line and a third gate line which are sequentially arranged. Such configuration can not only increase display area but also improve touch sensitivity.

Figure 3:
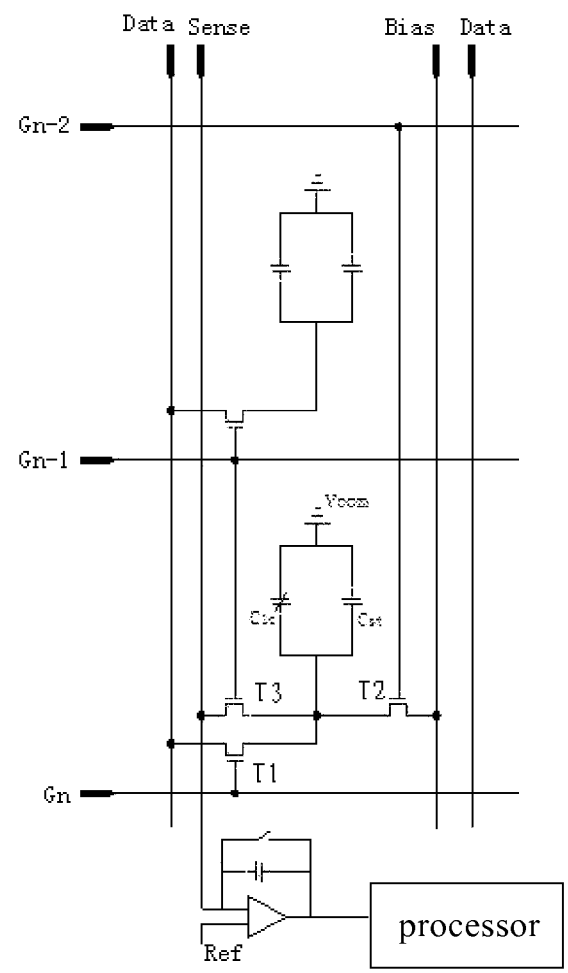
FIG. 3 is a partial enlarged diagram of area A in the array substrate of Embodiment 1 of the present invention.

FIG. 3 illustrates a partial enlarged diagram of the area A in FIG. 1, and specifically illustrates a schematic diagram of structures of two pixel units in two adjacent rows (i.e., two adjacent pixels in the same column) As shown in FIG. 3, the two pixel units are defined by data lines Data, a first gate line Gn-2, a second gate line Gn-1 and a third gate line Gn, and also comprises a sensing line Sense and a signal line Bias. Each pixel unit comprises a storage capacitor and a first thin film transistor T1, and only one of the two pixel units comprises a touch-control unit, which comprises: a second thin film transistor T2 and a third thin film transistor T3. In the pixel unit in which the touch-control unit is included (i.e., the pixel unit defined by the second gate line Gn-1, the third gate line Gn and the data lines Data in FIG. 3), a gate of the first thin film transistor T1 is connected to the third gate line Gn, a source thereof is connected to the data line Data, a drain thereof is connected to a source of the second thin film transistor T2, a drain of the third thin film transistor T3 and one end of the storage capacitor; a gate of the second thin film transistor T2 is connected to the first gate line Gn-2, a drain thereof is connected to the signal line Bias; a gate of the third thin film transistor T3 is connected to the second gate line Gn-1, and a source thereof is connected to a processor through the sensing line Sense. In this case, when a scanning signal is input through the first gate line Gn-2, the second thin film transistor T2 is turned on, and the signal line Bias charges the storage capacitor in the pixel unit corresponding to the touch-control unit through the second thin film transistor T2; when a scanning signal is input through the second gate line Gn-1, the third thin film transistor T3 is turned on, the storage capacitor in the pixel unit corresponding to the touch-control unit starts to discharge, information of a charge quantity discharged by the storage capacitor is transferred to the processor through the sensing line Sense, and the processor determines a touch position by analyzing and comparing a change in the charge quantity; when a scanning signal is input through the third gate line Gn, the first thin film transistor T1 is turned on, that is to say, the pixel unit is driven to achieve a display function.

Preferably, the touch-control units provided in the pixel units in a same column may be connected to a same sensing line Sense. In addition, the touch-control units provided in the pixel units in a same column may be connected to a same signal line Bias. In this way, when manufacturing the array substrate, the process can be simplified, costs can be saved and wiring is facilitated.

It should be noted that, the storage capacitor in the present embodiment refers to both a first storage capacitor Cst and a liquid crystal capacitor Clc shown in FIGS. 1 to 3.

Embodiment 2

The present embodiment provides a display panel, which comprises the array substrate described in Embodiment 1, the display panel further comprises an opposite substrate which is assembled with the array substrate, and the opposite substrate may be a color filter substrate. The other end of the storage capacitor is provided on the color filter substrate and is connected to a common electrode Vcom. Of course, the display panel provided by the present embodiment also comprises other conventional elements, which are not elaborated herein.

As the display panel of the present embodiment comprises the above array substrate, the aperture ratio thereof can be significantly improved.

It should be noted that, the principle of realizing touch control by the display panel of the present embodiment is as follows: when a touch occurs, a distance between the array substrate and the opposite substrate varies, a formula, $Clc = \epsilon_0 \epsilon_r A/d$, is satisfied, wherein $\epsilon_0 \epsilon_r$ is a dielectric constant of liquid crystal, d is a cell thickness, and A is a cross-sectional area of a pixel. When the display panel is touched, both the cell thickness d of the display panel and orientations of liquid crystal molecules are changed, which will cause the dielectric constant of liquid crystal to change, these changes then cause the liquid crystal capacitor to change, and therefore, coordinates of a touch point can be determined based on a change in the liquid crystal capacitor.

Embodiment 3

With respect to the display panel of the above Embodiment 2, the present embodiment provides a display method of the display panel, which comprises steps of:

in a touch-control phase, providing touch-control driving signals to the touch-control units, so as to determine a position of a touch point; and in a display phase, providing grayscale signals to the array substrate, so as to enable the pixel units to display.

Specifically, the array substrate in the display panel comprises: data lines Data and gate lines formed on a substrate, the data lines Data and the gate lines are provided intersecting with and insulating from each other and define a plurality of pixel units, and touch-control units are provided in at least a part of the pixel units.

For ease of description, the display method of the display panel is described by only taking two pixel units in adjacent two rows as shown in FIG. 3 as an example.

As described above, the two pixel units are defined by data lines Data, a first gate line Gn-2, a second gate line Gn-1 and a third gate line Gn, and also comprises a sensing line Sense and a signal line Bias. Each pixel unit comprises a storage capacitor and a first thin film transistor T1, and only one of the two pixel units comprises a touch-control unit, which comprises: a second thin film transistor T2 and a third thin film transistor T3. In the pixel unit in which the touch-control unit is included (i.e., the pixel unit defined by the second gate line Gn-1, the third gate line Gn and the data lines Data in FIG. 3), a gate of the first thin film transistor T1 is connected to the third gate line Gn, a source thereof is connected to the data line Data, a drain thereof is connected to a source of the second thin film transistor T2, a drain of the third thin film transistor T3 and one end of the storage capacitor; a gate of the second thin film transistor T2 is connected to the first gate line Gn-2, a drain thereof is connected to the signal line Bias; a gate of the third thin film transistor T3 is connected to the second gate line Gn-1, and a source thereof is connected to a processor through the sensing line Sense.

In this case, the display method specifically comprises the following steps. In the touch-control phase, when a scanning signal is input through the first gate line Gn-2, the second thin film transistor T2 is turned on, and the signal line Bias charges the storage capacitor in the pixel unit in which the touch-control unit is provided through the second thin film transistor T2; when a scanning signal is input through the second gate line Gn-1, the third thin film transistor T3 is turned on, the storage capacitor in the pixel unit in which the touch-control unit is provided starts to discharge, and information of a charge quantity discharged by the storage capacitor is transferred to the processor through the sensing line Sense. The processor determines a touch position by analyzing and comparing a change in the charge quantity.

In the display phase, when a scanning signal is input through the third gate line Gn, the first thin film transistor T1 is turned on, and a grayscale signal is input through the data line Data to drive the pixel unit, thus achieving a display function.

Embodiment 4

The present embodiment provides a display device comprising the display panel described in Embodiment 2. The display device may be any product or component with a display function, such as a mobile phone, a tablet computer, a television, a display, a notebook computer, a digital photo frame, a navigator or the like.

The display device provided by the present embodiment comprises the display panel in Embodiment 2, and therefore has a better display effect.

Of course, the display device provided by the present embodiment may also comprise other conventional structures, such as a power unit, a display driving unit and the like, which are not elaborated herein.

It can be understood that, the above implementations are merely exemplary implementations for explaining the principle of the present invention, but the present invention is not limited thereto. For those skilled in the art, various variations and improvements may be made without departing from the spirit and essence of the present invention, and these variations and improvements are also deemed as the protection scope of the present invention.

The invention claimed is:

1. An array substrate, comprising data lines and gate lines formed on a substrate, wherein, the data lines and the gate lines are provided intersecting with and insulating from each other and define a plurality of pixel units, each of which comprises: a storage capacitor and a first thin film transistor, a gate of the first thin film transistor is connected to the corresponding gate line, a source thereof is connected to the corresponding data line, a drain thereof is connected to one end of the storage capacitor, touch-control units are provided in only a part of the pixel units, each touch-control unit is provided in one of the pixel units and in two adjacent rows of the pixel units defined by a first gate line, a second gate line and a third gate line which are sequentially arranged, only one row of the pixel units are provided with the touch-control units therein, wherein the array substrate further comprises sensing lines and signal lines, wherein each touch-control unit comprises: a second thin film transistor and a third thin film transistor, and in each pixel unit provided with the touch-control unit, a gate of the second thin film transistor is connected to the first gate line, a drain thereof is connected to the signal line, and a source thereof is connected to the drain of the first thin film transistor;

a gate of the third thin film transistor is connected to the second gate line, a source thereof is connected to a processor through the sensing line, and a drain thereof is connected to the drain of the first thin film transistor; and the gate of the first thin film transistor is connected to the third gate line.

2. The array substrate according to claim 1, wherein, an amplifier is provided between the sensing line and the processor, an input terminal of the amplifier is connected to the sensing line, an output terminal thereof is connected to the processor, and the amplifier is used for amplifying an electrical signal received by the sensing line.

3. The array substrate according to claim 2, wherein, the touch-control units provided in the pixel units in a same column are connected to a same sensing line.

4. The array substrate according to claim 3, wherein, the touch-control units provided in the pixel units in a same column are connected to a same signal line.

5. The array substrate according to claim 1, wherein, the touch-control units provided in the pixel units in a same column are connected to a same sensing line.

6. The array substrate according to claim 5, wherein, the touch-control units provided in the pixel units in a same column are connected to a same signal line.

7. A display method of a display panel, the display panel comprising the array substrate according to claim 1, and the display method comprising:
in a touch-control phase, providing touch-control driving signals to the touch-control units, so as to determine a position of a touch point; and
in a display phase, providing grayscale signals to the array substrate, so as to enable the pixel units to display.

8. The display method according to claim 7, wherein, in the display panel, in two adjacent rows of the pixel units defined by a first gate line, a second gate line and a third gate line which are sequentially arranged, one row of the pixel units are provided with the touch-control units therein, and the display panel further comprises sensing lines and signal lines, wherein the touch-control unit comprises: a second thin film transistor and a third thin film transistor, and in each pixel unit provided with the touch-control unit,
a gate of the second thin film transistor is connected to the first gate line, a drain thereof is connected to the signal line, and a source thereof is connected to the drain of the first thin film transistor;
a gate of the third thin film transistor is connected to the second gate line, a source thereof is connected to a processor through the sensing line, and a drain thereof is connected to the drain of the first thin film transistor; and
the gate of the first thin film transistor is connected to the third gate line, and the display method specifically comprises:
in the touch-control phase, inputting a scanning signal through the first gate line to turn on the second thin film transistor, so that the storage capacitor in the pixel unit in which the touch-control unit is provided is charged through the signal line; inputting a scanning signal through the second gate line to turn on the third thin film transistor, so that the storage capacitor in the pixel unit in which the touch-control unit is provided discharges and information of a charge quantity is transferred to the processor; and
in the display phase, inputting a scanning signal through the third gate line to turn on the first thin film transistor, and inputting a grayscale signal through the data line to drive the pixel unit to display.

9. A display panel, comprising an array substrate, which comprises data lines and gate lines formed on a substrate, wherein, the data lines and the gate lines are provided intersecting with and insulating from each other and define a plurality of pixel units, each of which comprises: a storage capacitor and a first thin film transistor, a gate of the first thin film transistor is connected to the corresponding gate line, a source thereof is connected to the corresponding data line, a drain thereof is connected to one end of the storage capacitor, touch-control units are provided in only a part of the pixel units, each touch-control unit is provided in one of the pixel units and in two adjacent rows of the pixel units defined by a first gate line, a second gate line and a third gate line which are sequentially arranged, only one row of the pixel units are provided with the touch-control units therein,
wherein the array substrate further comprises sensing lines and signal lines, wherein each touch-control unit comprises: a second thin film transistor and a third thin film transistor, and in each pixel unit provided with the touch-control unit,
a gate of the second thin film transistor is connected to the first gate line, a drain thereof is connected to the signal line, and a source thereof is connected to the drain of the first thin film transistor;
a gate of the third thin film transistor is connected to the second gate line, a source thereof is connected to a processor through the sensing line, and a drain thereof is connected to the drain of the first thin film transistor; and
the gate of the first thin film transistor is connected to the third gate line.

10. The display panel according to claim 9, wherein, an amplifier is provided between the sensing line and the processor, an input terminal of the amplifier is connected to the sensing line, an output terminal thereof is connected to the processor, and the amplifier is used for amplifying an electrical signal received by the sensing line.

11. The display panel according to claim 10, wherein, the touch-control units provided in the pixel units in a same column are connected to a same sensing line.

12. The display panel according to claim 11, wherein, the touch-control units provided in the pixel units in a same column are connected to a same signal line.

13. The display panel according to claim 9, wherein, the touch-control units provided in the pixel units in a same column are connected to a same sensing line.

14. The display panel according to claim 13, wherein, the touch-control units provided in the pixel units in a same column are connected to a same signal line.

* * * * *